(12) United States Patent
Jeon et al.

(10) Patent No.: US 12,504,389 B2
(45) Date of Patent: *Dec. 23, 2025

(54) METHOD FOR DETERMINING ATOMIC COMPOSITION USING FOUR-COLOR X-RAY EQUIPMENT

(71) Applicant: Republic of Korea (Chief of Presidential Security Service), Seoul (KR)

(72) Inventors: Je Hwan Jeon, Seoul (KR); Hyun Woo Lee, Seoul (KR); Tae In Ryu, Daejeon (KR)

(73) Assignee: Republic of Korea (Chief of Presidential Security Service), Seoul (KR)

( * ) Notice: Subject to any disclaimer, the term of this patent is extended or adjusted under 35 U.S.C. 154(b) by 390 days.

This patent is subject to a terminal disclaimer.

(21) Appl. No.: 18/012,860

(22) PCT Filed: Jun. 25, 2021

(86) PCT No.: PCT/KR2021/008007
§ 371 (c)(1),
(2) Date: Dec. 23, 2022

(87) PCT Pub. No.: WO2021/261951
PCT Pub. Date: Dec. 30, 2021

(65) Prior Publication Data
US 2023/0266256 A1  Aug. 24, 2023

(30) Foreign Application Priority Data

Jun. 25, 2020  (KR) ......................... 10-2020-0077771

(51) Int. Cl.
*G01N 23/083* (2018.01)

(52) U.S. Cl.
CPC ..... *G01N 23/083* (2013.01); *G01N 2223/408* (2013.01); *G01N 2223/639* (2013.01)

(58) Field of Classification Search
CPC ........... G01N 23/083; G01N 2223/408; G01N 2223/639
See application file for complete search history.

(56) References Cited

U.S. PATENT DOCUMENTS 4,029,963 A * 6/1977 Alvarez ................. A61B 6/482
250/374
5,357,110 A * 10/1994 Statham ................ H01J 37/256
250/307

(Continued)

FOREIGN PATENT DOCUMENTS

| JP | H8-068768 A | 3/1996 |
| JP | 2007-064727 A | 3/2007 |
| KR | 10-2230737 B1 | 3/2021 |

OTHER PUBLICATIONS

JLK Inspection, Inc., "Final Report of Preliminary Study on the Implementation of Artificial Intelligence (AI) in the Field of X-Ray Reading to Advance Customs Border Management", Sep. 24, 2021, with English Summary, 79 pages, cited in NPL No. 2.

(Continued)

*Primary Examiner* — Blake C Riddick
(74) *Attorney, Agent, or Firm* — Hauptman Ham, LLP (57) ABSTRACT

Provided is a method for determining an atom using four-color X-ray equipment capable of determining which group an atom having a greatest atomic number among atoms constituting a material belongs on the periodic table.

5 Claims, 5 Drawing Sheets

(56) References Cited

U.S. PATENT DOCUMENTS

| | | | |
|---|---|---|---|
| 6,678,396 B2 | 1/2004 | Bartle | |
| 6,865,287 B1* | 3/2005 | Beneke | H04N 23/30 |
| | | | 382/167 |
| 7,471,764 B2 | 12/2008 | Kaval | |
| 7,769,132 B1* | 8/2010 | Hurd | G01V 5/224 |
| | | | 378/57 |
| 7,783,005 B2 | 8/2010 | Kaval | |
| 8,054,938 B2 | 11/2011 | Kaval | |
| 8,165,268 B1 | 4/2012 | Hurd et al. | |
| 8,290,230 B2 | 10/2012 | Chen et al. | |
| 8,515,010 B1* | 8/2013 | Hurd | G01N 23/083 |
| | | | 378/57 |
| 8,750,452 B2 | 6/2014 | Kaval | |
| 8,897,415 B2 | 11/2014 | Hurd et al. | |
| 8,903,046 B2 | 12/2014 | Morton | |
| 9,223,050 B2 | 12/2015 | Kaval | |
| 9,632,205 B2 | 4/2017 | Morton | |
| 10,386,532 B2 | 8/2019 | Morton | |
| 10,408,967 B2 | 9/2019 | Morton | |
| 10,942,291 B2 | 3/2021 | Morton | |
| 11,307,325 B2 | 4/2022 | Morton | |
| 2003/0091144 A1 | 5/2003 | Bartle | |
| 2003/0147484 A1* | 8/2003 | Olshansky | G01N 23/222 |
| | | | 376/157 |
| 2005/0105680 A1* | 5/2005 | Nabors | G01N 23/10 |
| | | | 378/57 |
| 2005/0287252 A1* | 12/2005 | Schrock | G01N 33/12 |
| | | | 426/231 |
| 2006/0098773 A1* | 5/2006 | Peschmann | G01N 23/04 |
| | | | 378/57 |
| 2006/0269135 A1* | 11/2006 | Ramsay | G06V 10/56 |
| | | | 382/181 |
| 2006/0269161 A1* | 11/2006 | Ramsay | G06F 18/23 |
| | | | 382/276 |
| 2006/0280286 A1* | 12/2006 | Kaval | G01N 23/04 |
| | | | 378/57 |
| 2008/0013819 A1* | 1/2008 | Eilbert | G01N 23/04 |
| | | | 382/141 |
| 2008/0159605 A1* | 7/2008 | Ramsay | G06V 10/56 |
| | | | 382/128 |
| 2009/0010521 A1* | 1/2009 | Ramsay | G06V 10/255 |
| | | | 382/141 |
| 2009/0010545 A1* | 1/2009 | Ramsay | G06V 10/56 |
| | | | 382/195 |
| 2009/0129544 A1* | 5/2009 | Chen | G01N 23/04 |
| | | | 378/62 |
| 2009/0141863 A1 | 6/2009 | Kaval | |
| 2011/0080999 A1 | 4/2011 | Kaval | |
| 2011/0243382 A1* | 10/2011 | Morton | A61B 6/482 |
| | | | 378/57 |
| 2012/0257718 A1 | 10/2012 | Kaval | |
| 2013/0039472 A1 | 2/2013 | Morton | |
| 2013/0156156 A1* | 6/2013 | Roe | G01V 5/223 |
| | | | 378/57 |
| 2013/0294574 A1* | 11/2013 | Peschmann | G01V 5/224 |
| | | | 378/41 |
| 2013/0315464 A1 | 11/2013 | Hurd et al. | |
| 2014/0226789 A1* | 8/2014 | Bendahan | G01N 23/203 |
| | | | 378/86 |
| 2015/0285940 A1 | 10/2015 | Kaval | |
| 2015/0325010 A1* | 11/2015 | Bedford | G01V 5/22 |
| | | | 378/57 |
| 2016/0084984 A1* | 3/2016 | Franco | G01N 23/04 |
| | | | 378/57 |
| 2016/0154139 A1 | 6/2016 | Morton | |
| 2016/0266054 A1* | 9/2016 | Cao | G01T 1/247 |
| 2017/0023697 A1* | 1/2017 | Chen | G01N 23/04 |
| 2017/0299764 A1 | 10/2017 | Morton | |
| 2017/0329036 A1 | 11/2017 | Morton | |
| 2018/0329107 A1* | 11/2018 | Toppan | G01N 23/02 |
| 2019/0162679 A1* | 5/2019 | Yamakawa | A61B 6/483 |
| 2020/0158908 A1 | 5/2020 | Morton | |
| 2020/0158909 A1 | 5/2020 | Morton | |
| 2020/0309987 A1* | 10/2020 | Xu | G01V 5/224 |
| 2020/0386904 A1 | 12/2020 | Morton | |
| 2022/0252752 A1 | 8/2022 | Morton | |
| 2024/0118449 A1* | 4/2024 | Morton | G01V 5/222 |

OTHER PUBLICATIONS

International Search Report issued Oct. 18, 2021, corresponding to International Application No. PCT/KR2021/008007, 5 pages, citing the above reference(s).

The Extended European Search Report dated Nov. 20, 2023 for corresponding European Patent Application No. 21829519.4 (8 pages).

United Arab Emirates Search Report issued Nov. 25, 2024, corresponding to United Arab Emirates Application No. P6001094/2021, 6 pages.

* cited by examiner

METHOD FOR DETERMINING ATOMIC COMPOSITION USING FOUR-COLOR X-RAY EQUIPMENT

CROSS-REFERENCE TO RELATED APPLICATIONS

The present application is a national stage filing under 35 U.S.C. § 371 of PCT application number PCT/KR2021/008007 filed on Jun. 25, 2021, which is based upon and claims the benefit of priority to Korean Patent Application No. 10-2020-0077771 filed on Jun. 25, 2020, in the Korean Intellectual Property Office, which are incorporated herein by reference in their entireties.

TECHNICAL FIELD

The present disclosure relates to a method for determining, by color, which group of the periodic table an atom having a greatest atomic number among atoms constituting a material belongs, using X-ray equipment displaying a four-color image and the periodic table.

DESCRIPTION OF RELATED ART

The X-ray market is dominated by various companies such as Smiths Detection, Analysed Images, 3DX-RAY, SCANNA MSC Ltd. of the United Kingdom, Adani, Astrophysics Inc., and OSI Systems of the United States, and Optosecurity of Canada. These companies are also developing technologies for imaging acquired signals in addition to technology of hardware such as X-ray generating devices and detectors.

X-ray equipment is used to determine authenticity of a material. When the material passed through an inside of an X-ray scanner and is photographed, the photographed image is displayed on the screen, and a search agent determines the authenticity thereof based on the image.

Initial X-ray equipment used a method of generating an X-ray image by projecting X-ray onto an object and subsequently designating brightness of the image according to an amount of X-rays detected by an X-ray detector. However, black and white image displayed by the X-ray equipment has only the brightness of the object, so readability of the image is degraded.

In order to address the problem, a method of reading organic material and inorganic material by comparing displayed colors based on transmittance of X-rays radiated at different angles is used.

However, the standard for determining the color is ambiguous in the method of reading the organic material and the inorganic material. In addition, the method of reading the organic material and the inorganic material has a limitation in accurately reading because the readers have different reading abilities according to experience of the readers and causes fatigue of the readers.

Therefore, research is needed to determine the authenticity of the material by determining the atoms of the material by a scientific method, regardless of the difference in experience of the readers.

SUMMARY OF THE DISCLOSURE

The present disclosure provides a method for determining an atom constituting a material by a scientific method, regardless of a difference in experience of readers.

The present disclosure also provides a method for determining an atom, comprising determining which group an atom having a greatest atomic number belongs by displaying color of the group including the atom having the greatest atomic number among the atoms constituting the material.

The present disclosure further provides a method for determining an atom for determining authenticity of the material.

The present disclosure further provides the method for determining the atom to quickly and accurately detect prohibited items among items brought to major national facilities such as airports, harbors, military units, event halls, stadiums, exhibition halls, concert halls, government buildings, and spaces where very important person (VIP) is guarded.

Aspects of the present disclosure are not limited to those mentioned herein. Further, aspects of the present disclosure which have not been mentioned may be understood by the following description and more clearly understood by the embodiments of the present disclosure. It will also be readily apparent that the aspects of the present disclosure may be implemented by features described in claims and a combination thereof.

According to the present disclosure, the method for determining the atom using the four-color X-ray equipment includes inspecting the atoms with the X-ray equipment displaying a four-color image, classifying atoms into a first group to a fourth group by indicating the first group including atoms having atomic numbers 1 to 10 in first color, indicating the second group including atoms having atomic numbers 12 to 18 in second color, indicating the third group including atoms having atomic numbers 20 to 40 in third color, and indicating the fourth group including atomic numbers 42 or more in fourth color on the periodic table, and when inspecting a material including a molecular unit with the X-ray equipment displaying the four-color image, displaying color of the group including the atom having the greatest atomic number among the atoms of the material, and determining which group among the first group to the fourth group the atom having the greatest atomic number belongs.

The first color may include an orange color.
The second color may include a green color.
The third color may include a blue color.
The fourth color may include a black color.

The method for determining the atom according to the present disclosure has an effect of determining, by color, whether the atom having the greatest atomic number among the atoms constituting the material belongs to at least one of groups on the periodic table, regardless of the difference in experience of the readers.

In addition, the method for determining the atom according to the present disclosure has an effect of determining the authenticity of the material.

In addition, the method for determining the atom according to the present disclosure has an effect of quickly and accurately detecting prohibited items among the items brought to major national facilities, such as airports, harbors, military units, event halls, stadiums, exhibition halls, concert halls, government buildings, and spaces where the VIP is guarded.

Hereinafter, further effects of the present disclosure, in addition to the above-mentioned effect, are described together while describing specific matters for implementing the present disclosure.

BRIEF DESCRIPTION OF THE DRAWINGS

FIG. 4 shows a group including an atom having an atomic number on the periodic table classified by color after inspecting atoms with X-ray equipment displaying a four-color image according to the present disclosure.

DETAILED DESCRIPTION OF EXEMPLARY IMPLEMENTATIONS

Some embodiments of the present disclosure are described in detail with reference to accompanying drawings. Therefore, a person having ordinary knowledge in the art to which the present disclosure pertains may easily implement the technical idea of the present disclosure. A detailed description of a well-known technology relating to the present disclosure may be omitted if it unnecessarily obscures the gist of the present disclosure. One or more embodiments of the present disclosure are described in detail with reference to the accompanying drawings. Same reference numerals can be used to refer to same or similar components.

In this document, the terms "upper," "lower," "on," "under," or the like are used such that, where a first component is arranged at "an upper portion" or "a lower portion" of a second component, the first component may be arranged in contact with the upper surface (or the lower surface) of the second component, or another component may be disposed between the first component and the second component. Similarly, where a first component is arranged on or under a second component, the first component may be arranged on or under (in contact with) the second component, or one or more other components may be disposed between the first component and the second component.

Further, the terms "connected," "coupled," or the like are used such that, where a first component is connected or coupled to a second component, the first component may be directly connected or able to be connected to the second component, or one or more additional components may be disposed between the first and second components, or the first and second components may be connected or coupled through one or more additional components.

Hereinafter, a method for determining an atom using four-color X-ray equipment according to some embodiments of the present disclosure is described.

According to the present disclosure, in the X-ray reading experiment of explosives, the inventors studied why different colors are detected depending on types of chemical materials as a raw material and completed a method for determining which group and which position on the periodic table the atom having a greatest atomic number among atoms constituting a material belongs and is located.

The "material" in the present disclosure is a target material for X-ray inspection and may include compounds and mixtures in a gas, liquid, and/or solid state and having a mass. Furthermore, the material has a molecular unit and may include prohibited items such as guns, weapons, firearms, explosives, flammable materials, toxic materials, drugs, and disposable gas lighters, which should not be brought to major national facilities such as airports, harbors, military units, event halls, stadiums, exhibition halls, concert halls, government buildings, spaces where very important person (VIP) is guarded.

According to the present disclosure, the method for determining an atom using four-color X-ray equipment include inspecting atoms with the X-ray equipment displaying a four-color image, classifying atoms into a first group to a fourth group by indicating the first group including atoms having atomic numbers 1 to 10 in first color, indicating the second group including atoms having atomic numbers 12 to 18 in second color, indicating the third group including atoms having atomic numbers 20 to 40 in third color, and indicating the fourth group including atoms having atomic numbers 42 or more in fourth color on the periodic table.

After the classification, when a material containing a molecular unit is inspected using the X-ray equipment displaying the four-color image, color of the group including the atom having a greatest atomic number among the atoms of the material is displayed and the user determines whether the atom having the greatest atomic number belongs to at least one of the first group to the fourth group.

X-rays generate high voltage (high-speed electrons). Electrons (−) bounce off at the cathode (tungsten filament) and collide with the anode (+). In this case, when the high-speed electrons collide with the anode, energy including high heat and X-rays is generated. Because the X-ray has a greater magnitude of energy, the X-ray has a strong fluorescence effect on the material and may easily penetrate the material. In this case, the X-ray ionizes the material.

Transmittance of the X-rays varies depending on density and the atomic number of the material, and an amount of X-rays detected by the X-ray detector varies depending on the transmittance thereof.

For example, as a result of inspection using a two-color X-ray displaying a black and white image, a portion having high transmittance of an object is displayed in black and a portion having relatively low transmittance of an object is displayed in white.

In contrast to the two-color X-ray equipment displaying the black and white images, the X-ray equipment displaying the four-color image of the present disclosure acquires a lower-energy image and a high-energy image with respect to about 5 keV and linearly combines the lower-energy image with the high-energy image. Therefore, the X-ray equipment displaying the four-color image may display the color of the material to be inspected by one or more of the four colors.

Alternatively, the X-ray equipment displaying the four-color image may use two sources, or may be used by adjusting to alternately generate the X-ray having the low-energy energy and the X-ray having the high-energy using a source. Therefore, the X-ray equipment displaying the four-color image may display the color of the material to be measured in one or more of the four colors.

The four-color image includes an orange color, a green color, a blue color, and a black color.

Examples of X-ray equipment displaying the four-color image used in the present disclosure include HI-SCAN 5030i, HI-SCAN 7555i, HI-SCAN 100100V-2is, HI-SCAN 6040-2is HR, HI-SCAN 7555aTiX, and HI-SCAN 6040aX from Smith Detection Corporation, XR3D from Botti Detection Corporation, and EI-5030C from East Image Corporation.

In the present disclosure, as a result of inspecting the atoms using the X-ray equipment displaying the four-color image, it was confirmed that the displayed colors differ according to the atomic numbers.

The atoms were inspected in the following manner using the X-ray equipment displaying the four-color image.

An atom to be experimented is a pure atom with purity of 97.0% or higher and without impurities. For example, the atom to be experimented may be material such as boron, carbon, or magnesium from Sigma-Aldrich Corporation.

First, the atoms to be experimented are placed in a disposable weighing dish such as plastic dish (having 8 cm of width*8 cm of length*2 cm of depth and made of polystyrene).

There is a difference in weight depending on types of atoms, but the atom having weight of about 10±5 g per atom is placed in the dish.

Subsequently, the dish containing the atom is placed on a conveyor belt passing through an inside of the X-ray equipment (e.g., Hi-scan 5030i from Smith Detection Corporation).

Figure 1:
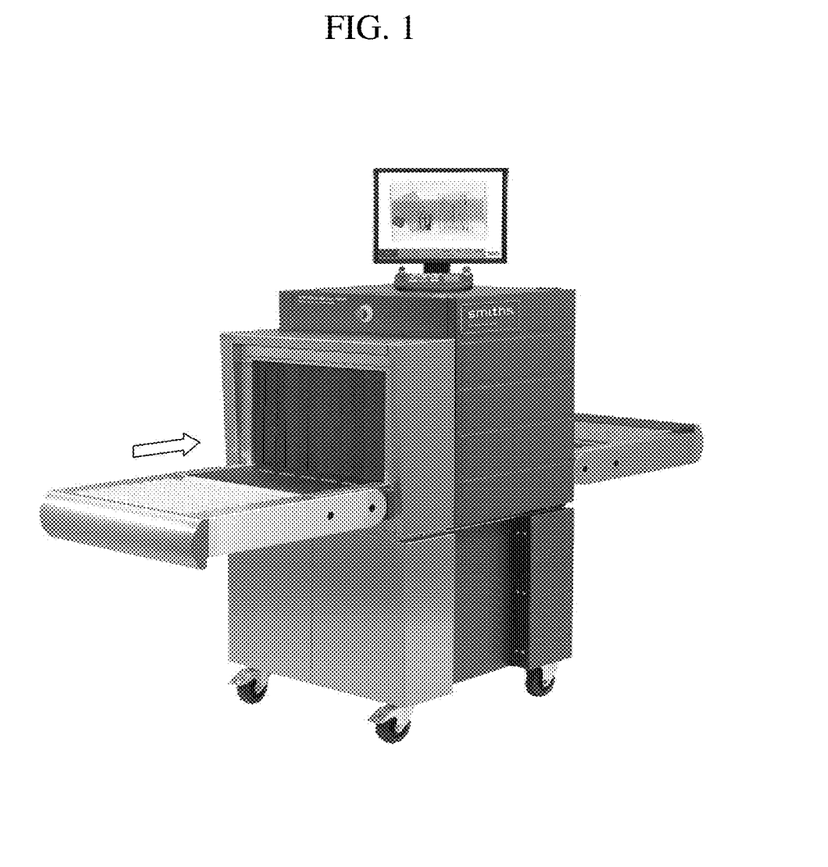
FIG. 1 is a photograph of X-ray equipment used in a method for determining an atom of the present disclosure.
Figure 2:
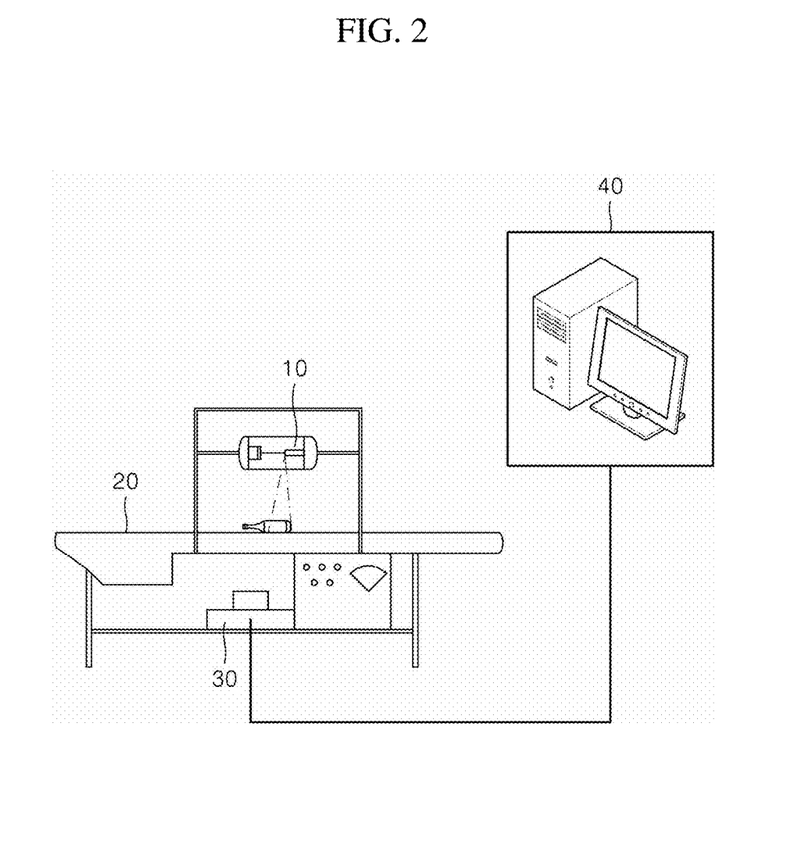
FIG. 2 is a schematic diagram of X-ray equipment to show a method for determining an atom of the present disclosure.

Referring to FIGS. 1 and 2, an X-ray tube 10 emits X-rays by collision of electric charges generated using high-voltage electricity. An X-ray detector 30 disposed below a conveyor belt 20 detects an X-ray transmitted image and transmits the image to the screen of a computer 40.

In this case, a distance from a surface of the dish or the atom contained in the dish to a tube of the X-ray equipment displaying the four-color image is adjusted to about 10 to 30 cm. Preferably, the distance may be adjusted to 20 to 30 cm. If the separated distance thereof is less than 10 cm, it may be difficult to focus the material to be experimented. If the separated distance thereof exceeds 30 cm, the material may be difficult to be read because the distance between the material to be experimented and the tube is too long.

If the atom is liquid, the container may be inspected by putting the atom in the container on the market in consideration of harmfulness to the human body. The final color of the atom was derived in consideration of the material of the container containing the liquid.

For example, as materials of the container, glass may be green and plastic may be orange.

Even if the atom is gas, the container on the market may be inspected by putting the atom in the container on the market.

In this way, the color displayed according to the atomic number was identified by directly photographing the atom to be experimented with contained in the container on the market.

Figure 3:
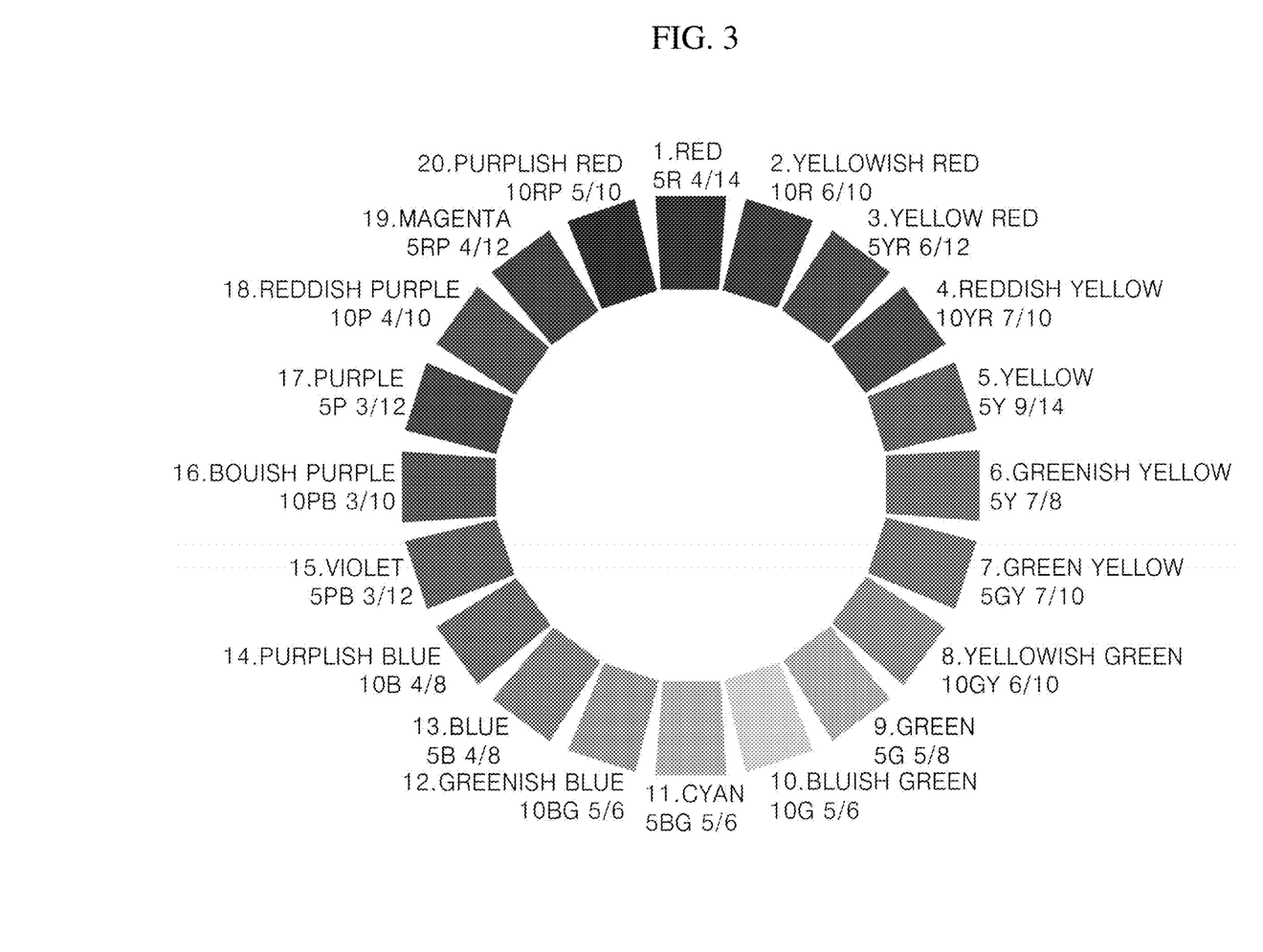
FIG. 3 shows a Munsell's 20-color circle to distinguish four color images according to the present disclosure.

FIG. 3 is a Munsell's 20-color circle to distinguish four-color images according to the present disclosure.

Orange color, green color, blue color, and black color of a four-color image are distinguished based on a Munsell's 20-color circle.

The color circle is an arrangement of colors by connecting the spectrum of visible light in a ring shape. 20 colors were displayed according to hue, value/chroma (HV/C), which is the principle of color expression.

1. Red represents primary color R in the Munsell's 20-color circle.

5. Yellow represents primary color Y in the Munsell's 20-color circle.

9. Green represents primary color G in the Munsell's 20-color circle.

13. Blue represents primary color B in the Munsell's 20-color circle.

17. Purple represents primary color P in the Munsell's 20-color circle.

Specifically, the range from 1. red to 5. yellow indicated in the Munsell's 20-color circle corresponds to orange color.

The range from 6. greenish yellow to 12. greenish blue indicated in the Munsell's 20-color circle corresponds to green color.

The range from 13. blue to 18. reddish purple indicated in the Munsell's 20-color circle corresponds to blue color, and complete black may be distinguished as black color.

As shown in FIG. 4, hydrogen (H) having atomic number 1 to neon (Ne) of atomic number 10 are indicated in the first color, which is the orange color.

Magnesium (Mg) having atomic number 12 to argon (Ar) having atomic number 18 are indicated in a second color, which is the green color.

Calcium (Ca) having atomic number 20 to zirconium (Zr) having atomic number 40 are indicated in a third color, which is a blue color.

Lastly, molybdenum (Mo) having atomic number 42 to organeson (Og) having atomic number 118 are indicated in a fourth color, which is a black color.

In this case, each of sodium (Na) having atomic number 11, potassium (K) having atomic number 19, and niobium (Nb) having atomic number 41 is a point at which color is changed and has its own color.

The sodium (Na) has an orange color.

The potassium (K) has a green color.

The niobium (Nb) has a blue color.

When the three atoms, that is, the sodium (Na), the potassium (K), and the niobium (Nb) form a compound or a mixture with other atoms, the three atoms do not affect color determination when X-ray reading. Details thereof are described below.

Elements having colors commonly displayed on the periodic table are classified into a first group (S1), a second group (S2), a third group (S3), and a fourth group (S4).

Subsequently, a material containing a molecular unit is inspected using the X-ray equipment displaying the four-color image. The method of inspecting the material is performed in the same manner as the method of inspecting the atom.

First, as the material has a weight difference depending on the type and volume thereof, a container or a dish capable of containing the material is prepared.

The dish containing the material is placed on a conveyor belt passing through an inside of the X-ray equipment (Hi-scan 5030i from Smith Detection Corporation). In this case, a distance from a surface of the dish or the material contained in the dish to a tube of the X-ray equipment displaying a four-color image is adjusted to about 10 to 30 cm.

If the material is liquid, the container containing the material may be inspected in consideration of the harmfulness to the human body. Even if the material is gas, the container containing the gas may be inspected.

For example, when water is contained in a tumbler container made of iron (Fe), the tumbler container made of the iron is displayed in blue and the water inside the container is displayed in orange. The orange and the blue are displayed at the same time because the water is present in any area of the tumbler container. In this case, an amount of water remaining inside the tumbler container may be estimated based on a distribution of the orange color.

Figure 5:
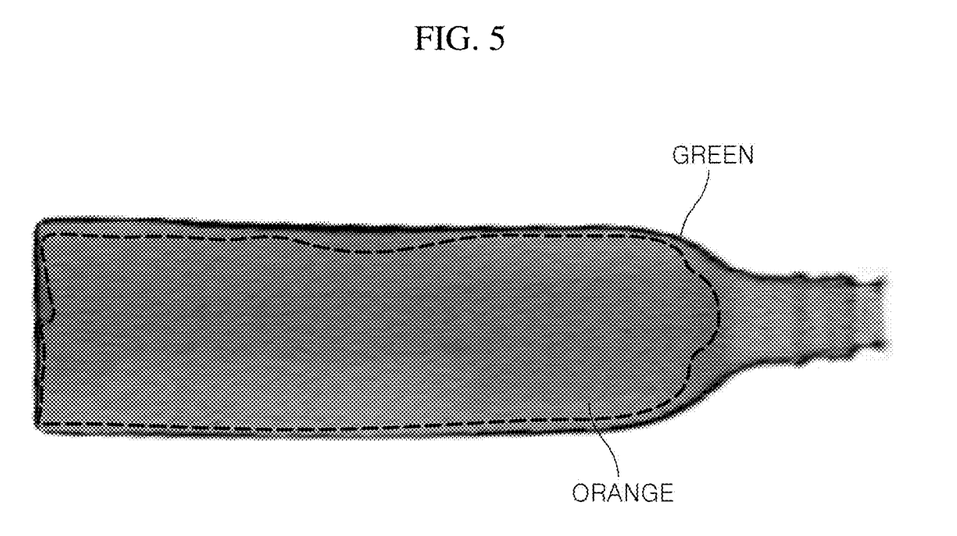
FIG. 5 is an X-ray image of water contained in a glass bottle according to an embodiment of the present disclosure.

In another example, as shown in FIG. 5, when a glass bottle contains water, the glass bottle is displayed in green and the water inside the glass bottle is displayed in orange.

In another example, if the glass bottle contains $CO_2$ gas, the glass bottle is displayed in green and the $CO_2$ gas inside the glass bottle is displayed in orange.

In another example, if butane gas ($C_4H_{10}$) is contained in a butane gas container made of iron (Fe), when the butane gas contained in the butane gas container made of the iron passed through the X-ray equipment, the thin container made of the iron is displayed in blue and the butane gas inside the container is displayed in orange. The orange and the blue are displayed at the same time because liquefied butane gas is present in any area of the butane gas container.

In this case, an amount of butane gas remaining inside the butane gas container may be estimated based on a distribution of the orange color.

In this way, the colors displayed according to the material were checked by directly photographing the material in the container on the market.

During inspection, the material is displayed in one of the first color to the fourth color. In this case, the user compares the color displayed on the screen with the color estimated based on the molecular formula of the material and determines whether the atom having a greatest atomic number belongs to at least one of the first group to the fourth group.

Specifically, when a material to be inspected is inspected using the X-ray equipment displaying the four-color image, color of a group including an atom having a greatest atomic number among atoms constituting a molecule in the material is displayed.

In this case, the user visually checks the color displayed on the screen.

The user may compare the color displayed on the screen with the color estimated based on the molecular formula of the material and determine which group among the first group to the fourth group the atom having the greatest atomic number belongs.

For example, water ($H_2O$) is examined.

The water contains two hydrogen (H) and oxygen (O). An atom having a greatest atomic number is oxygen (O) among the hydrogen and the oxygen, so it is assumed that the orange color of the group including the oxygen (O) may be displayed.

During the X-ray inspection, if the orange is displayed on the screen, the inspected material is determined as water. However, if green, blue, or black colors are displayed instead of the orange, the inspected material is determined as not being water.

If the material is displayed in black, the user may determine the atom having the greatest atomic number among the atoms of the material as an atom belonging to the fourth group.

In another example, flour is inspected.

The flour contains starch ($C_6H_{10}O_5$) which is polysaccharide carbohydrate ($H_2O$), gluten, and the like and contains dozens of atoms. The atom having the greatest atomic number is oxygen (O), so it is assumed that the orange color of the group including the oxygen (O) may be displayed.

During the X-ray inspection, if the orange is displayed on the screen, the inspected material is determined as the flour. If the green, the blue, or the black are displayed instead of the orange, the inspected material is determined as not being flour.

If the material is displayed in blue, the user may determine the atom having the greatest atomic number among the atoms of the material as an atom belonging to the third group.

In another example, nitric acid ($HNO_3$) is inspected.

An atom having a greatest atomic number is oxygen (O) among the atoms contained in the nitric acid. When the nitric acid ($HNO_3$) is inspected by X-ray, orange has to be displayed on the screen.

Sulfur (S) has a greatest atomic number among atoms of sulfuric acid ($H_2SO_4$). When the sulfuric acid ($H_2SO_4$) is inspected by X-ray, green has to be displayed on the screen.

As ammonium nitrate ($NH_4NO_3$) has a greatest atomic number of oxygen (O), orange has to be displayed on the screen during the X-ray inspection.

If a material containing at least one of sodium (Na) having atomic number 11, potassium (K) having atomic number 19, or niobium (Nb) having atomic number of 41 on the periodic table is inspected, the three atoms do not affect color determination when the X-ray reading.

Specifically, when inspecting a material containing the atom having atomic number 11 and atoms having atomic numbers other than the atomic number 11 on the periodic table, the color of the group including the atom having the greatest atomic number among the atoms having the remaining atomic numbers except for the atomic number 11 is displayed.

The user may compare the displayed color with the color estimated by the molecular formula of the material and determine which group among the first group to the fourth group the atom having the greatest atomic number among the atoms of the remaining atomic numbers except for atomic number 11 belongs.

For example, a salt (NaCl) is inspected. The salt contains sodium (Na) and chlorine (Cl). As the sodium (Na) does not affect color determination, green of the group including the chlorine (Cl) having the greatest atomic number among the atoms except for the sodium (Na) may be displayed. During the X-ray inspection, if green is displayed on the screen, the inspected material is determined as salt, and if orange, blue, or black color are displayed instead of the green, the inspected material is determined as not being salt.

If the material is displayed in blue, the user may determine the atom having the greatest atomic number among the atoms excluding the sodium as an atom belonging to the third group.

Similarly, when inspecting a material containing an atom having atomic number 19 and atoms having atomic numbers except for the atomic number 19 on the periodic table, the color of the group including the atom having the greatest atomic number among the atoms having atomic numbers except for the atomic number 19 is displayed. In this case, the user may determine which group among the first group to the fourth group the atom having the greatest atomic number belongs.

In addition, when inspecting a material containing an atom having atomic number 41 and atoms having atomic numbers except for the atomic number 41 on the periodic table, the color of the group including the atom having the greatest atomic number among the atoms having the remaining atomic numbers except for the atomic number 41 is displayed. In this case, the user may determine which group among the first group to the fourth group the atom having the greatest atomic number belongs. Therefore, authenticity of the material may be determined.

That is, when inspecting a material containing at least one of the sodium (Na) having atomic number 11, the potassium (K) having atomic number 19, and the niobium (Nb) having atomic number 41, the color of the group including the atom having the greatest atomic number among the atoms except for the sodium (Na), the potassium (K), and the niobium (Nb) is displayed.

When a material not including the sodium (Na), the potassium (K), and the niobium (Nb) is inspected, the color of the group including the atom having the greatest atomic number among the atoms contained in the material is displayed.

Therefore, the method for determining the atom using the four-color X-ray equipment of the present disclosure uses displaying the color of the group including the atom having the greatest atomic number among the atoms of the material with the X-ray equipment displaying the four-color image and the periodic table. The user may compare the color displayed on the screen with the color estimated based on the molecular formula of the material and may determine the group and the position of the atom having the greatest atomic number, on the periodic table.

The method for determining the atom of the present disclosure enables reading an atom constituting a molecule and quickly and accurately determining the atom using the scientific method. In addition, the color of the material may be estimated based on the molecular formula of the material.

Furthermore, the method for determining the atom of the present disclosure effectively detects prohibited items among items brought to major national facilities such as airports, harbors, military units, event halls, stadiums, exhibition halls, concert halls, government buildings, and spaces where the VIP is guarded.

For example, as materials that humans may eat or drink mainly consist of organic materials, orange may be displayed on the X-ray image when bringing food.

However, if green or blue are displayed, it can be seen that there is abnormality. In this case, the take-in of dangerous goods may be blocked by checking the correct use and materials of the take-in goods.

In addition, chemical, biological, and radiological (CBR) materials are dangerous chemical materials capable of mass destruction. In particular, radiological materials are high-risk materials that may paralyze the function of the country by contaminating a wide area.

All radiological materials belong to group 4 of the periodic table, so they have a dark black color.

In addition, the radiological material has a unique radioactive pattern around the radiological material due to a radioactivity radiation phenomenon occurring only in the radioactive material. Therefore, the authenticity of the radiological material is easily determined and the prohibited items may be effectively detected using the method for determining the atom of the present disclosure.

Chemical agents attack the central nervous system when they contact the human body, cause blisters on the skin and a choking action, or interfere with transportation of oxygen in the blood. The chemical agents are dangerous chemical materials and may not be actually tested by a general method to see X-ray inspection results of the chemical agents.

It can be seen that, based on the molecular formula thereof, the chemical agents contain phosphorus (P) or chlorine (Cl) components.

For example, VX (which is nerve agent and having chemical formula of $C_{11}H_{26}NO_2PS$) agonists include P (phosphorus) and S (sulfur). Based on the above structure, it can be estimated that green-color image may be displayed on the screen. The method for determining the atom of the present disclosure may enable predicting that the green color may be displayed by a simple method without the X-ray equipment, and the same results were obtained when the experiment was actually conducted.

If the method for determining the atom of the present disclosure is used, a difference in reading abilities of the X-ray equipment, which was dependent on the experience of the readers, is reduced, so the national agencies may block the take-in of the dangerous materials in advance according to functions thereof. Therefore, the method for determining the atom may enable playing an important role in ensuring safety and a life zone of fellow countrymen, and ultimately achieving the stability of the country.

For example, any material passed through the inside of an X-ray scanner and is photographed to read whether any material is a dangerous material such as an explosive, terror articles, or a cartridge case. When the photographed image is displayed on the screen, the user may determine the authenticity of the material, that is, whether the material is the dangerous material or not based on the image.

Compared to the method of reading the organic material and inorganic material based on the colors using the X-ray equipment in the related art, the method for determining determines which group of the periodic table the atom having the greatest atomic number among the atoms constituting a material, that is, a heaviest atom, belongs, regardless of density, thickness, and transmittance of the material and determines the authenticity of the material. Therefore, the method for determination enables the scientific reading.

A detailed embodiment of the method for determining the atom using the four-color X-ray equipment is described below.

Embodiment

Whether which group atoms constituting sugar belong is determined using HI-SCAN 5030i equipment of Smith Detection Corporation.

First, the atoms were inspected using X-ray equipment, and as shown in FIG. 4, elements were classified according to commonly displayed colors.

As the material to be inspected has a molecular formula of sugar ($C_{12}H_{22}O_{11}$), orange color of the group including the atom having a greatest atomic number may be displayed.

10 g of the sugar was put in a disposable weighing dish [(8 cm of width*8 cm of length*2 cm of depth and made of polystyrene)], passed through the X-ray equipment (HI-SCAN 5030i), and was inspected.

In this case, a distance between the sugar and a tube of the X-ray equipment was maintained at 30 cm.

During the inspection, the color (orange) estimated based on the molecular formula of the material was compared with the color displayed on the screen, and the color displayed on the screen was displayed in green. That is, the colors did not match.

In this case, it can be seen that the inspected material is not sugar. In addition, an atom having a greatest atomic number among the atoms of the inspected material is determined as belonging to a second group indicated in green.

The present disclosure has been described as described above with reference to exemplary drawings; however, the present disclosure is not limited to the embodiments and the drawings disclosed herein, and various modifications can be made by those skilled in the art within the scope of the technical idea of the present disclosure. Further, even if working effects obtained based on configurations of the present disclosure are not explicitly described in the description of embodiments of the present disclosure, effects predictable based on the corresponding configuration have to be recognized.

What is claimed is:

1. A method for determining an atomic composition using a four-color X-ray machine, comprising:
inspecting atoms using the X-ray machine displaying a four-color image and classifying the atoms into a first group to a fourth group by indicating the first group comprising atoms having atomic numbers 1 to 10 in a first color, indicating a second group comprising atoms having atomic numbers 12 to 18 in a second color, indicating a third group comprising atoms having atomic numbers 20 to 40 in a third color, and indicating the fourth group comprising atoms having atomic numbers 42 or more in a fourth color on the periodic table, and when inspecting a material containing a molecular unit using the X-ray machine displaying the four-color image, displaying the color of the group comprising the atom having a greatest atomic number among the atoms contained in the material, and determining which group among the first group to the fourth group the atom having the greatest atomic number belongs, wherein if the material contains sodium (Na) having an atomic number 11, potassium (K) having an atomic number 19, or niobium (Nb) having an atomic number of 41 on the periodic table is inspected, the atom of sodium, potassium, or niobium does not affect the displaying the color.

2. The method for determining the atomic composition using the four-color X-ray machine of claim 1, wherein the first color comprises orange color.

3. The method for determining the atomic composition using the four-color X-ray machine of claim 1, wherein the second color comprises a green color.

4. The method for determining the atomic composition using the four-color X-ray machine of claim 1, wherein the third color comprises blue color.

5. The method for determining the atomic composition using the four-color X-ray machine of claim 1, wherein the fourth color comprises black color.

* * * * *